(12) United States Patent
Schaffer (10) Patent No.: US 8,534,691 B2
(45) Date of Patent: Sep. 17, 2013

(54) FLEXIBLE BICYCLE DERAILLEUR MOUNT

(75) Inventor: Alon Schaffer, Kibbutz Beit Oren (IL)

(73) Assignees: Ofer Ariely, Haifa (IL); Alon Schaffer, Kibbutz Beit Oren (IL)

( * ) Notice: Subject to any disclaimer, the term of this patent is extended or adjusted under 35 U.S.C. 154(b) by 493 days.

(21) Appl. No.: 12/679,669

(22) PCT Filed: Sep. 23, 2008

(86) PCT No.: PCT/IL2008/001277
§ 371 (c)(1),
(2), (4) Date: Mar. 24, 2010

(87) PCT Pub. No.: WO2009/040803
PCT Pub. Date: Apr. 2, 2009

(65) Prior Publication Data
US 2010/0201097 A1     Aug. 12, 2010

(30) Foreign Application Priority Data

Sep. 24, 2007 (IL) .......................................... 186237

(51) Int. Cl.
*B62M 1/00* (2010.01)
*F16H 9/00* (2006.01)
(52) U.S. Cl.
USPC ............... 280/260; 280/261; 474/80; 474/82
(58) Field of Classification Search
USPC ........................ 280/260, 261; 474/80, 81, 82
See application file for complete search history.

(56) References Cited

U.S. PATENT DOCUMENTS

| 4,734,084 | A | 3/1988 | Nagano |
| 5,425,678 | A | 6/1995 | Richardson |
| 6,203,459 | B1 * | 3/2001 | Calendrille, Jr. ................ 474/82 |
| 2004/0177713 | A1 * | 9/2004 | Shahana .................... 74/473.14 |

FOREIGN PATENT DOCUMENTS

| EP | 1375321 | 1/2004 |
| EP | 1486407 | 12/2004 |
| FR | 2578303 | 9/1986 |
| WO | WO 2009/001277 | 12/2008 |

OTHER PUBLICATIONS

International Preliminary Report on Patentability Dated Apr. 1, 2010 From the International Bureau of WIPO Re.: Application No. PCT/IL2008/001277.
International Search Report Dated Feb. 11, 2009 From the International Searching Authority Re.: Application No. PCT/IL2008/001277.
Written Opinion Dated Feb. 11, 2009 From the International Searching Authority Re.: Application No. PCT/IL2008/001277.
Office Action Dated Mar. 6, 2013 From the Israel Patent Office Re. Application No. 186237 and Its Translation Into English.
Office Action Dated Aug. 11, 2010 From the Israel Patent Office Re. Application No. 186237 and Its Translation Into English.

* cited by examiner

*Primary Examiner* — Kevin Hurley
*Assistant Examiner* — Marc A Scharich (57) ABSTRACT

Derailleur mounts for use in bicycles. The derailleur mount comprises an elastic element having a functional state and a collapsed state. The elastic element is configured for reducing at least some of an impact force of at least 300 Newton (N) applied on the bicycle by switching from the functional state to the collapsed state. The elastic element is configured for reverting from the collapsed state to the functional state after the impact force is removed.

16 Claims, 6 Drawing Sheets

FLEXIBLE BICYCLE DERAILLEUR MOUNT

RELATED APPLICATIONS

This Application is a National Phase of PCT Patent Application No. PCT/IL2008/001277 having International filing date of Sep. 23, 2008, which claims the benefit of Israel Patent Application No. 186237 filed on Sep. 24, 2007. The contents of the above Applications are all incorporated herein by reference.

FIELD OF THE INVENTION

The present invention relates to a derailleur gearing system. More specifically, the present invention relates to a mount used for protecting the derailleur gearing system and related parts of a bicycle.

BACKGROUND OF THE INVENTION

The derailleur mechanism of a rear gearing system is a vulnerable part of a bicycle. In order to protect the derailleur mechanism from being damaged when the bicycle encounters high force impacts, for example, when the bicycle is hit or falls down, some manufacturers confine the gearing system within the hub of the rear wheel of the bicycle or within the frame of the bicycle. Others use a derailleur mount for protecting an externally built derailleur mechanism. Such a derailleur mount is used as a buffer that absorbs impacts and thus protects the derailleur and/or the frame of the bicycle from being damaged.

The derailleur mount may be an integral part of the frame in of some bicycles. Other bicycles, such as full suspension bicycles, are commonly equipped with a removable derailleur mount, which is designed to be replaced when damaged. Some derailleur mounts are manufactured to fit various bicycle models, whereas other hangers are custom designed for a specific model of bicycles.

Commonly, the derailleur mount is made of an alloy softer than the alloy used for manufacturing the frame of the bicycle. Thus, when the bicycle is hit, the derailleur mount absorbs the impact and bends, thus, taking the blow and preventing the frame of the bicycle from being damaged.

However, the absorption of the impact by the derailleur mount may not eliminate possible damage to the bicycle. Frequently when the derailleur mount encounters impacts with high force, it bends inwardly towards the spokes of the rear wheel, causing the derailleur to miss shift the gears and in some cases, gets into the spokes while the rear wheel is revolving, causing damage to the spokes, for example by breaking and/or bending them.

In the worse case scenario, the derailleur pulls the spokes (backwards) so forcefully that the frame part that the derailleur is attached to may severely deform or may even break.

When the derailleur mount bends, it changes the angle at which the chain runs over the sprocket, and thus, the chain can no longer intertwine with the sprocket. As a result, the chain falls off the sprocket and ends up on the next sprocket in line. Consequently, because of the derailleur mount being substantially bent the derailleur gearing system is badly damaged.

From that point, as the rider continues shifting the bicycle into the low gears, the angle at which the chain runs onto the sprocket keeps decreasing, and thus, causes the chain to shift from a smaller sprocket to a larger one. Eventually, the chain is snagged on the sides of the teeth of the larger sprocket and twists.

Ultimately, the derailleur is forced into the spokes of the rear wheel, and it is impossible to continue riding the bicycle as the derailleur and the rear wheel are destroyed. The rider may lose balance and be tossed off the bicycle.

Various attempts have been made in the past to design derailleurs and derailleur mounts that do not deform when the bicycle is hit or falls down on the ground. Some of these inventions are described hereinafter.

The following first three patents disclose derailleurs designed to withstand and absorb impacts. The forth patent discloses a shielding hanger designed to protect the derailleur from being damaged in case it is hit.

EP 0,061,365 (Huret) discloses an invention that overcomes the drawbacks of a conventional device employing a screw and a nut, in particular as concerns the mounting of the derailleur. This is achieved by providing on a support plate of the derailleur an elastically yieldable fastener, which is permanently fixed on the support plate and adapted to cooperate with the frame lug so as to ensure that the support plate remains in position relative to the frame lug. The support plate further comprises means for centering the support plate relative to the frame lug.

U.S. Pat. No. 4,734,084 (Nagano) describes a derailleur which includes a linkage mechanism comprising a fixing member fixed to the bicycle frame, a pair of linkage members pivoted to the fixing member, and a movable member carrying a chain guide and pivoted to the linkage members. The linkage mechanism is provided with a displacement structure which elastically biases the linkage mechanism axially of a multistage sprocket assembly when subjected to a force or pressure greater than a normal resistance against speed change, thereby preventing the fixing member and bicycle frame from being plastically deformed as a result of a sudden forceful impact, such as in a collision, hitting a foreign object of if the bicycle falls down.

WO 9,316,910 (Iwasaki) describes a rear derailleur for a bicycle that is small, light, low in production cost and free from damage when the bicycle falls on the ground. This rear derailleur comprises a base member supported on a bicycle frame in front of a multi-staged sprocket supported in turn around a hub shaft, an oscillating member connected to this base member at the proximal portion thereof in such a manner as to oscillate in a widthwise direction of a wheel and extending rearwardly, and a chain guide which rotatably supports a guide pulley and a tension pulley and is supported at the rear end portion of the oscillating member in such a manner as to rotate about a shaft substantially in parallel with the hub shaft while being elastically biased in a direction in which a tension is applied to the chain, wherein the guide pulley is oscillated in the widthwise direction of a wheel by drawing a speed-change operation cable connected to the above oscillating member, whereby the chain is switched to a desirable sprocket for engagement therewith.

EP 0,252,704 A2 (Kirk) discloses a bicycle frame made of lightweight alloy or metal such as magnesium and characterized in that a mounting for a chain guide sprocket for a rear derailleur comprises a bracket adapted to receive the guide sprocket mechanism in a threaded hole, and pivotally mounted on the frame so as to pivot rearwards as indicated in dashed lines from its normal position of use to create a clearance for the removal of a rear wheel mounted by means of a spindle in a slot. Optionally, the bracket is made of a plastics material, which is less structurally strong than the metal of the frame, so that the bracket will snap preferentially or sacrificially in the event of an impact, so that the frame itself will not be damaged, and the bracket merely needs to be replaced. The bracket may be somewhat yielding to absorb light impacts prior to fracture. The bracket may be pivoted onto the frame by means of a snap-in pin.

The derailleur mount described by Kirk in EP 0,252,704 A2 is made of plastic which is somewhat yielding to absorb light impacts. However, in cases of impacts, the derailleur mount may be hardly bent towards the frame of the bicycle and eventually may even break.

An aim of the present invention is to replace existing derailleur mounts, normally made of aluminum with derailleur mounts manufactured from a material sufficiently rigid to maintain the derailleur in its proper position under normal circumstances (i.e., when shifting gears), and at the same time flexible, so as to absorb the impact and return to its original shape and position.

Other advantages of the present invention will become apparent after reading the present specification and reviewing the accompanying figures.

SUMMARY OF THE INVENTION

There is thus provided, in accordance with some preferred embodiments of the present invention, a derailleur mount for use in a bicycle for protecting a derailleur mechanism of the bicycle or a frame of the bicycle from damage caused by a force applied during an impact and/or for reducing the portion of the force that is transferred to the derailleur mechanism. In such a manner, the derailleur mount may enable the rider to continue riding after the impact.

The derailleur mount comprising an element, optionally connectable, of an initial shape and/or position. Optionally, the element is designed to be positioned between the frame and the derailleur mechanism. Optionally, the element is integrally formed into the frame of the bicycle, for example at the upper and/or lower attachment joints, which are used for connecting the derailleur mechanism. Optionally, the elastic element is designed to function as a part, optionally integral, of the derailleur mechanism, for example as the bearing cylinder thereof. Optionally, the element is made of an elastic memory material enabling the element to revert automatically from a collapsed state to an extended state. Optionally, the elastic memory material is an elastomer that has a high elasticity coefficient, such as styrene-butadiene rubber (SBR)-copolymer of polystyrene and Polybutadiene, Nitrile Rubber (NBR)-copolymer of Polybutadiene and Acrylonitrile, called Buna N rubbers, hydrogenated Nitrile rubbers (HNBR)-Therban and Zetpol, Chloroprene Rubber (CR), Polychloroprene, Neoprene, Baypren etc. Optionally, the element is made of a material that possesses mechanical properties which account for the element buckling under impact forces and resuming its initial shape and position after the impact.

Furthermore, in accordance with some preferred embodiments of the present invention, the mechanical properties are such that when the derailleur mount is subjected to a lateral force of up to 500 Newton (N) the derailleur mount would bend and return to the initial shape and position.

Furthermore, in accordance with some preferred embodiments of the present invention, the material from which the derailleur mount is made of comprises one or more polymers.

Furthermore, in accordance with some preferred embodiments of the present invention, said one or more polymers comprises nylon.

Furthermore, in accordance with some preferred embodiments of the present invention, the one or more polymers are selected from a group of polymers including: Nylon 6 filled with 10% glass fiber, Nylon 6 filled with 20% glass fiber filled, and Nylon 6 filled with glass beads.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

In the drawings.

DETAILED DESCRIPTION OF PREFERRED EMBODIMENTS

In accordance with a preferred embodiment of the present invention, the derailleur mount is manufactured from an elastic material, a polymer for instance, that is flexible both to bending and to torsion. Thus, when the bicycle encounters high force impacts, for example when the bicycle is hit or falls down, damage to the bicycle frame, rear wheel or any of the auxiliary equipment or fittings is prevented or reduced.

The derailleur mount having an elastic element which is positioned to absorb some of the force that applied on and/or by the derailleur mechanism when the bicycle encounters high force impacts, such as force impacts of more than 300 N, 400 N, and 500 N. The elastic element of the derailleur mount opposites to this force and when the force excides a certain level, the elastic element collapses and switches from its functional state, referred to herein as an extended state, to a collapsed state. When the derailleur mount is in the functional state, it absorbs at least some of the force that is applied while regularly riding the bicycle on a paved and/or unpaved road. The collapsing absorbs some or all of the force that is applied on the hanger. Optionally, the collapsing absorbs more than 20%, 30%, 40%, 50%, or 60% of the force that is applied, optionally substantially laterally, on the hanger, the derailleur, and/or the bicycle. In such a manner, the force that is applied on and/or by the derailleur mechanism is reduced or prevented.

After the impact, the derailleur mount returns to its functional state, so that the complete chain drive mechanism remains intact and operational.

The derailleur mount may be manufactured as an integral part of the derailleur mechanism, as an integral part of the frame, or as a distinct, separate part. Optionally, the derailleur mount is detachable and configured for being replaced. In such an embodiment, the derailleur mount may be replaced when wear becomes substantial, noticeable, and/or when broken. Optionally, the derailleur mount comprises replaceable elements, such as elastic fuses, which are designed to absorb the aforementioned impact encountered by the bicycle. Optionally, the elastic fuses are designed to be replaced without detaching the derailleur mount.

Optionally, the derailleur mount comprises a mechanical mechanism for opposing forced that is applied thereon and for reverting from a collapsed state to a functional state. Optionally, the mechanical mechanism comprises one or more mechanical elements, optionally replaceable, which are designed to absorb automatically at least some of the energy of an impact force that is imposed on the bicycle during the transition from collapsed state to the functional state. Optionally, the mechanical mechanism comprises a set of one or more leaf springs designed to absorb some of the aforementioned impact. Optionally, the one or more leaf springs are based on a hydraulic, a pneumatic and/or a mechanical system.

Typically, the derailleur mount is attached, optionally integrally, to the bicycle frame and to the derailleur mechanism with pins. The attachment details, however, may be modified to suit frames of bicycles produced by various manufacturers.

Optionally, the derailleur mount is a fixed and non-pivoting part that may be removed and replaced if damaged. In case of a serious accident, which results in breaking of the derailleur mount or in distortion beyond its yield point, the derailleur mount may simply and easily be replaced. In some embodiments of the present invention, the derailleur mount is integrally formed with the derailleur. In some embodiments of the present invention, the derailleur mount is integrally formed with the frame of the bicycle.

Figure 1:
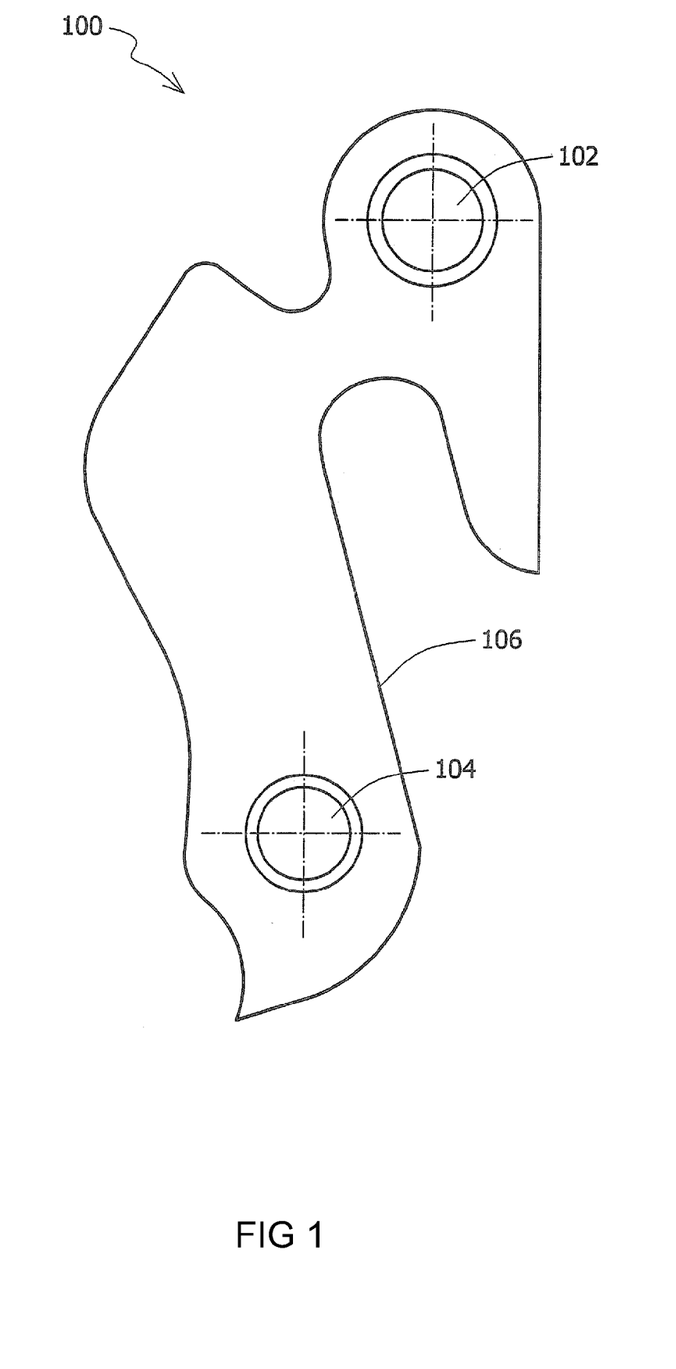
FIG. 1 illustrates a derailleur mount.

Given below is an elaboration of a preferred embodiment of the present invention, illustrated in the figures:

FIG. 1 illustrates a derailleur mount, denoted by numeral 100, made of a flexible material in accordance with a preferred embodiment of the present invention, the design of which is not necessarily different from other such hangers. As seen in the figure, the derailleur mount has an upper bore 102 for hosting a pin to attach the derailleur mount to the frame of the bicycle and a lower bore 104 for fitting an attaching pin attaching the derailleur mount to the derailleur mechanism. As illustrated, the surface area 106 of the derailleur mount is flat in accordance with a preferred embodiment of the present invention, but it may be designed differently to suit various frames of bicycles produced by different manufacturers.

Figure 2:
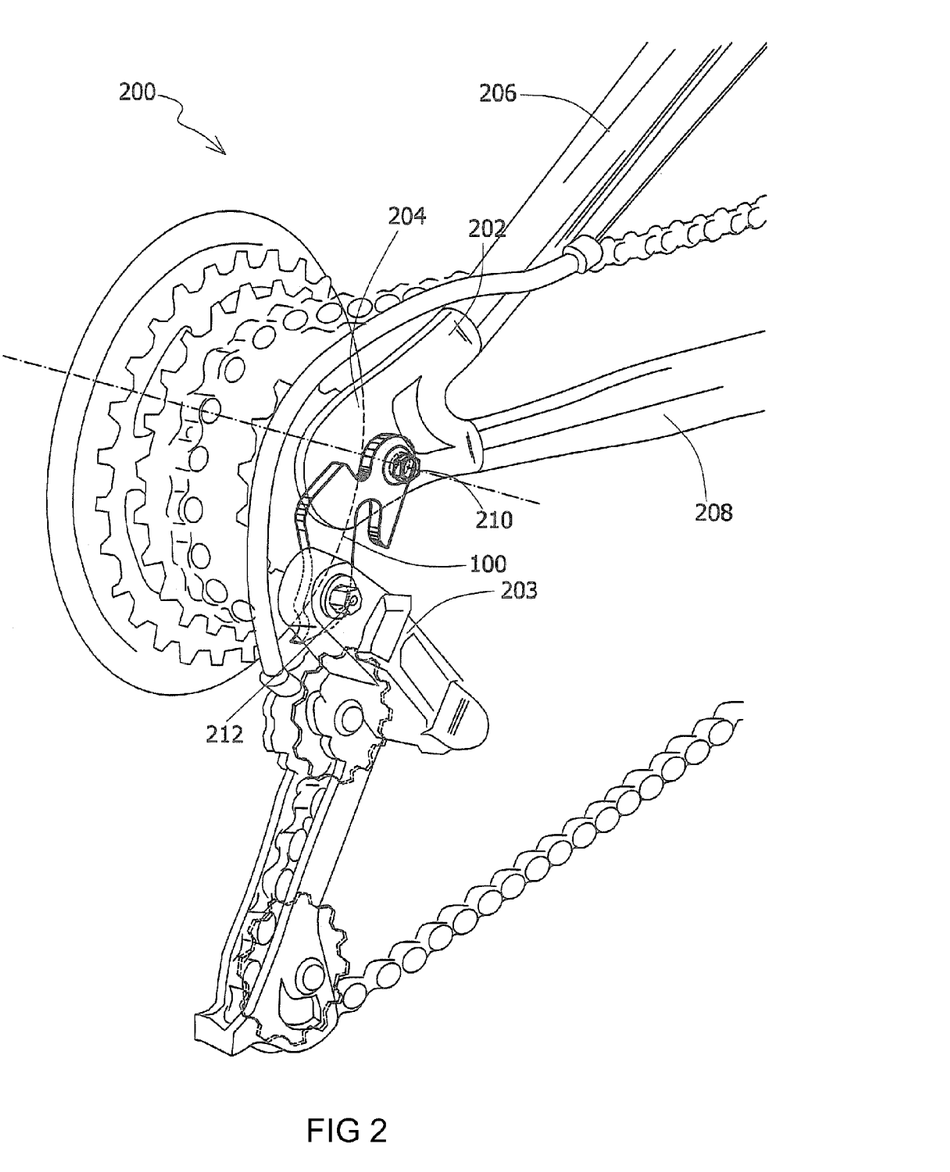
FIG. 2 illustrates the normal position of a derailleur mount when connected to the frame of the bicycle and to the derailleur mechanism.

FIG. 2 illustrates the normal position of derailleur mount 100 when connected to frame 202 of bicycle 200 and to derailleur mechanism 203. As seen in the figure, derailleur mount 100 is mounted on support fork 204 located at the connected ends of upper rear bar 206 and lower rear bar 208. The derailleur mount is attached to the support fork by pin 210 and pin 212, which pass through aligned bores in derailleur mount 100 and in support fork 204 and derailleur mechanism 203.

Figure 3:
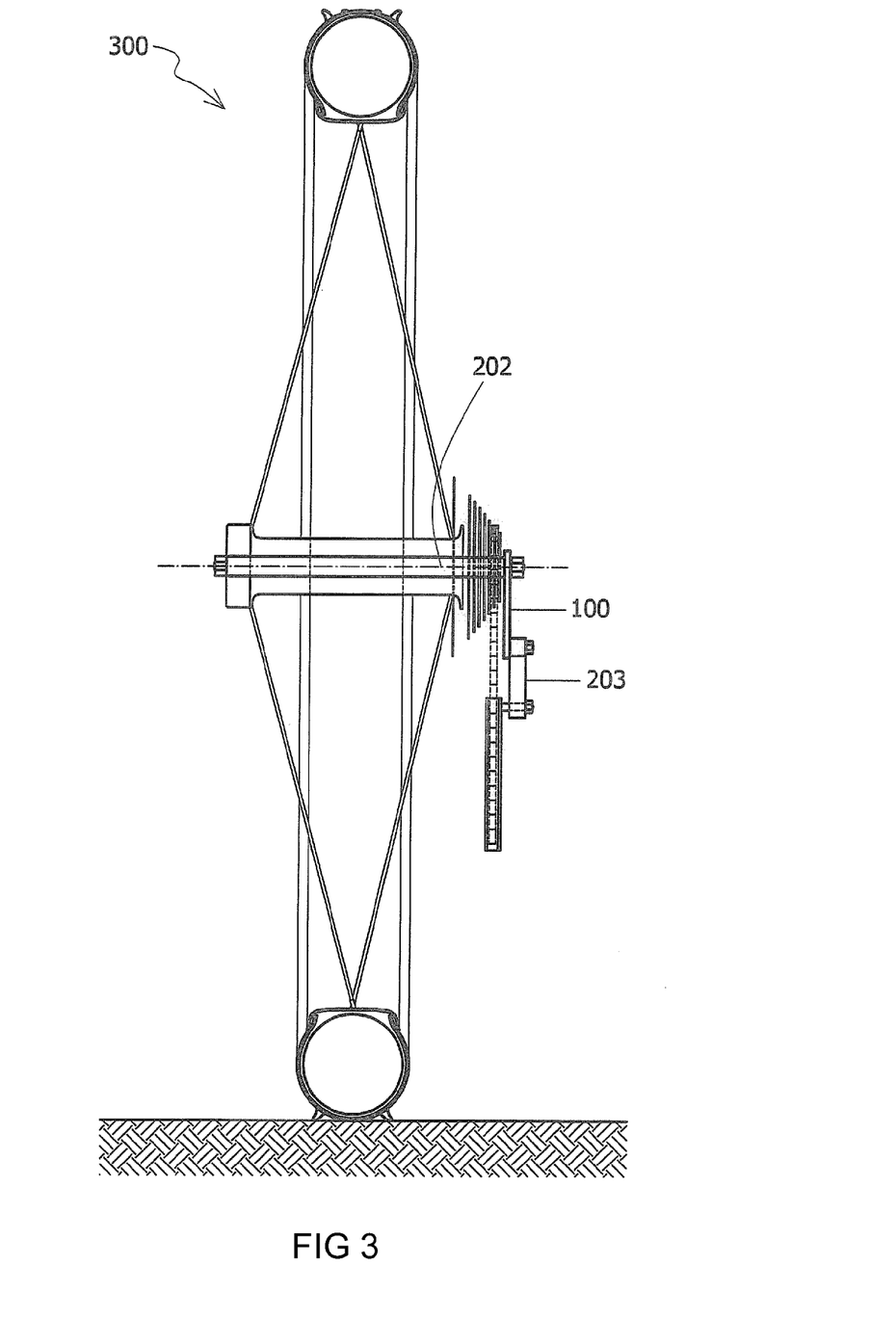
FIG. 3 is a cross-sectional view of the rear wheel of a bicycle showing a derailleur mount in its normal position.

FIG. 3 is a cross-sectional view of the rear wheel 300 of a bicycle showing a derailleur mount 100 in its normal position connected to frame 202 of the bicycle and to derailleur mechanism 203.

Figure 4:
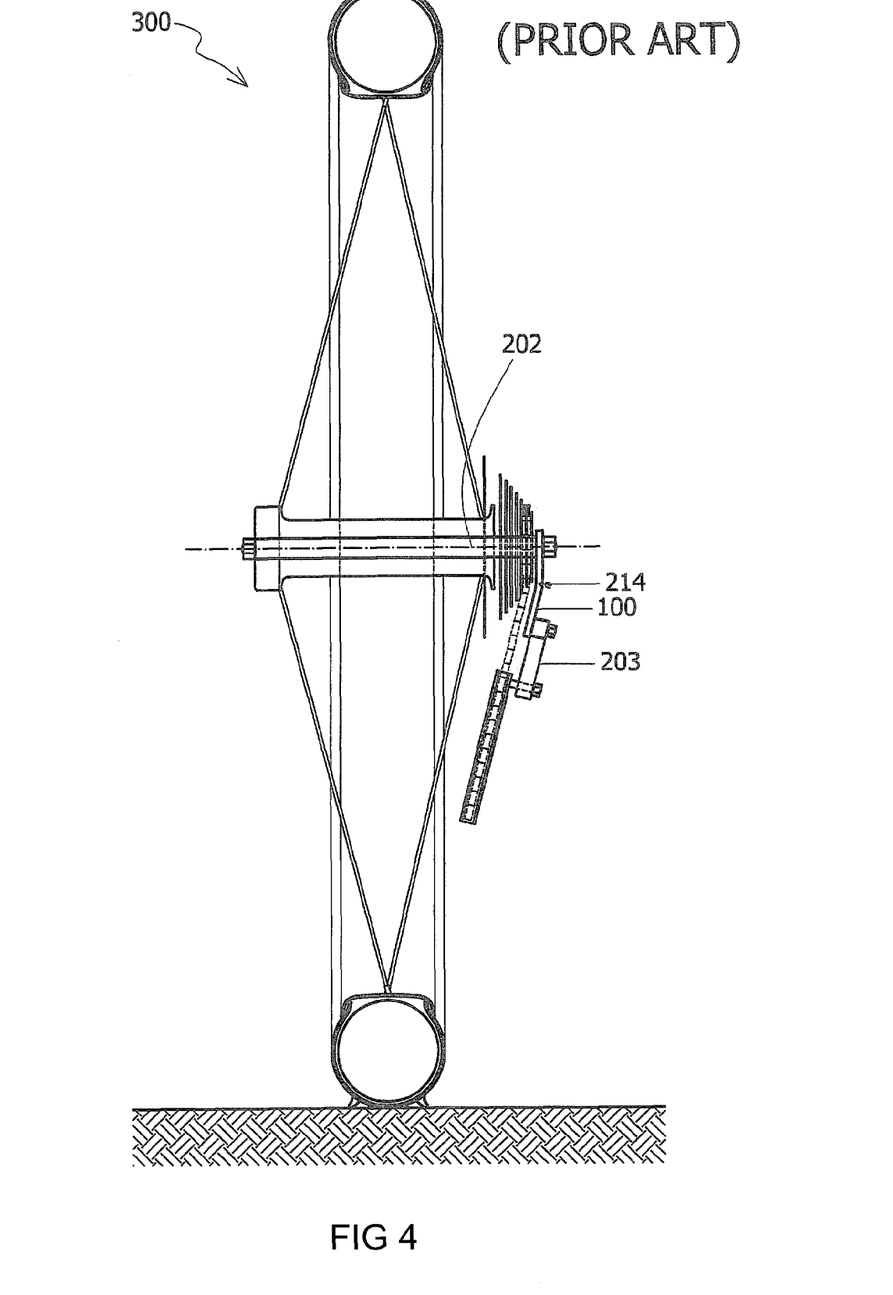
FIG. 4 is a cross-sectional view of the rear wheel showing a bent hanger made of a rigid material, which was hit and damaged (PRIOR ART)

FIG. 4 is a cross-sectional view of the rear wheel 300 showing bent hanger 100 at point 214 (PRIOR ART). The figure illustrates the drawback of currently available hangers made of rigid materials, such as aluminum, that bend when severely hit. More specifically, when the applied stress is greater than the stress corresponding to the yield strength of the material, hanger 100 bends or even breaks depending on the intensity of the hit.

Figure 5:
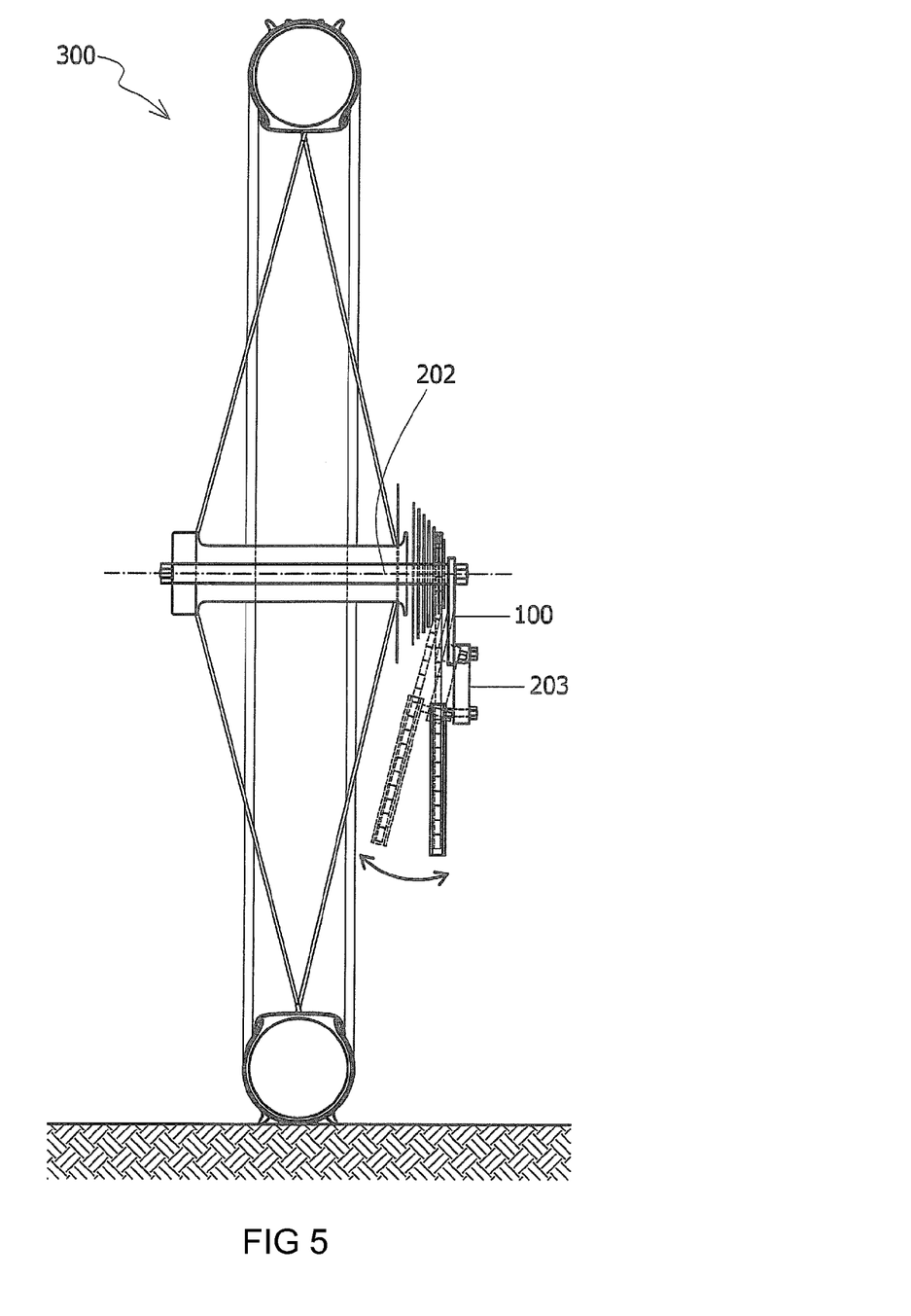
FIG. 5 is a cross-sectional view of the rear wheel illustrating a derailleur mount made of a flexible material that bends as a result of an impact and then returns to its original shape and position.

FIG. 5 is a cross-sectional view of the rear wheel showing derailleur mount 100 made of a flexible material such as Nylon 6 filled with 10% glass fiber, in accordance with a preferred embodiment of the present invention. The figure illustrates the advantage of hangers made of flexible materials, such as elastomers, which, as seen in the figure, are sufficiently rigid to maintain the derailleur mechanism in its proper position under normal circumstances but at the same time are flexible and return to their original shape after bending. As seen in the figure, derailleur mount 100 restores its original shape and position after bending.

The advantageous traits of a flexible derailleur mount as illustrated in FIG. 5 were explored in our recent experimental study. The study indicates that when a force of approximately 500 N is applied against a derailleur mount made of Nylon 6 filled with 10% glass fiber, it bends, optionally up to approximately 30 degrees, and immediately returns to its original shape and position However, when a force of similar magnitude is applied against a hanger made of aluminum, the latter breaks. As used herein immediately means within less than 800 milliseconds.

The study also identifies an optimal combination of mechanical properties: tensile yield strength greater than 250 MPa, flexural modulus in the range of 2.5 and 4 GPa, and elongation at yield greater than 7%, so that derailleur mounts made of materials possessing such mechanical properties are expected to withstand and overcome forceful hits (i.e., bend and quickly return to their original shape).

It should be noted, however, that the material from which a derailleur mount is manufactured not only has to possess a certain combination of mechanical properties but also should optionally be resistant to oil and other chemicals used on bicycles, and should optionally be sustainable, insensitive to sunlight.

Some typical materials possessing such characteristics include Nylon 6 filled with 10% glass fiber, Nylon 6 filled with 20% glass fiber filled, and Nylon 6 filled with glass beads. Optionally, the derailleur mount is made of an elastic memory material enabling the element to revert automatically from a collapsed state to an extended state. Optionally, the elastic memory material is an elastomer that has a high elasticity coefficient, such as styrene-butadiene rubber (SBR)-copolymer of polystyrene and Polybutadiene, Nitrile Rubber (NBR)-copolymer of Polybutadiene and Acrylonitrile, also called Buna N rubbers, hydrogenated Nitrile rubbers (HNBR)-Therban and Zetpol, Chloroprene Rubber (CR), Polychloroprene, Neoprene, Baypren etc. Optionally, the derailleur mount is designed to connect between the derailleur mechanism and commonly used derailleur hangers. Optionally, the elastic memory material of the derailleur mount is made of any combination of the aforementioned elastomers. Optionally, the elastic memory material derailleur mount combines strengthening fibers, such as glass, metal and/or steel fibers. Optionally, the fibers constitute at least 10%, 20%, or 30%, of the elastic memory material.

Figure 6A:
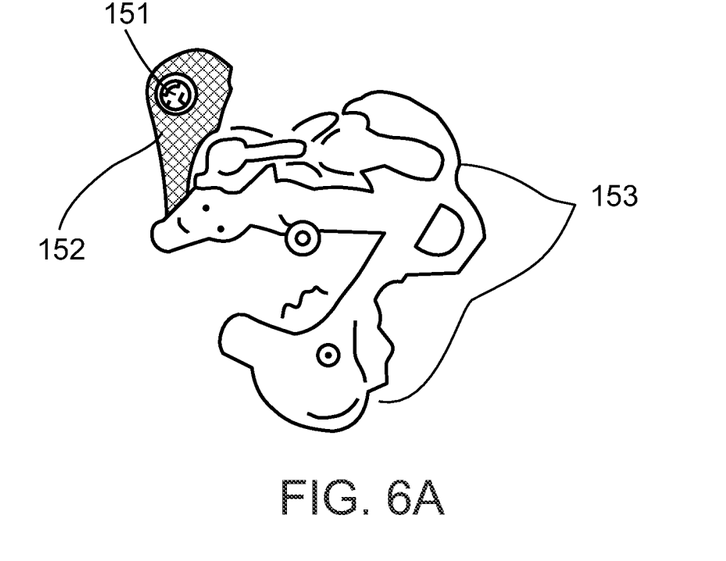
FIGS. 6A and 6B respectively illustrate functional state and collapsed state of an exemplary derailleur mount when connected between the frame of a bicycle and a derailleur mechanism, according to some embodiments of the present invention.
Figure 6B:
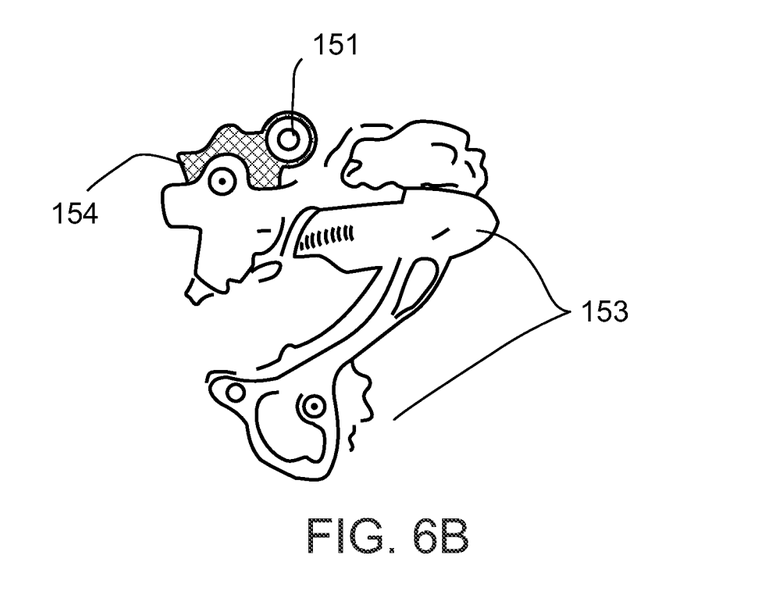

FIGS. 6A and 6B respectively illustrate the functional state and the collapsed state of a derailleur mount 154 when connected between the frame 202 of a bicycle (not shown) and the derailleur 153, according to some embodiments of the present invention. As described above, the derailleur mount 151, 154 is made of an elastic memory material enabling the element to revert automatically from a collapsed state 154, as shown at FIG. 6B, to an extended state 151, as shown at FIG. 6A. Optionally, as described above, the elastic memory material is an elastomer that has a high elasticity coefficient.

It should be clear that the description of the embodiments and attached figures set forth in this specification serves only for a better understanding of the invention, without limiting its scope.

It should also be clear that a person skilled in the art, after reading the present specification could make adjustments or amendments to the attached figures and above described embodiments that would still be covered by the present invention.

It is expected that during the life of a patent maturing from this application many relevant methods, systems, and apparatuses will be developed and the scope of the term elastic memory material is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A derailleur mount for use in a bicycle, comprising:
an elastic element made of one-piece, sized and shaped to connect between a frame of the bicycle and a derailleur mechanism and having a functional state and a collapsed state when subjected to an impact force causing torsion to said elastic element, said elastic element being configured for reducing at least some of said impact force applied on said derailleur mechanism by switching from said functional state to said collapsed state;
wherein said elastic element is configured for reverting from said collapsed state to said functional state after said impact force is removed.

2. The derailleur mount of claim 1, wherein said elastic element comprises a mechanical mechanism.

3. The derailleur mount of claim 2, wherein said mechanical mechanism comprises at least one leaf spring.

4. The derailleur mount of claim 3, wherein said elastic element is made of a material filled with a member of a group consisting of: glass fibers, metal fibers, steel fibers, steel beads, metal beads, and glass beads.

5. The derailleur mount as claimed in claim 4, wherein said member constitutes at least one of 10% of said elastic element, 20% of said elastic element, and 30% of said elastic element.

6. The derailleur mount of claim 1, wherein said elastic element is configured for reverting from said collapsed state to said functional state immediately after said impact force is removed.

7. The derailleur mount of claim 1, wherein said elastic element is made of a member of a group consisting of: a polymer, an elastomer, an elastic memory material, a styrene-butadiene rubber (SBR), Nitrile Rubber (NBR, hydrogenated Nitrile rubbers (HNBR), Chloroprene Rubber (CR), Polychloroprene, Neoprene, Baypren, and Polyamide 66.

8. The derailleur mount as claimed in claim 1, wherein said derailleur mount is integrally formed with at least one of a frame of said bicycle and a derailleur mechanism of said bicycle.

9. The derailleur mount as claimed in claim 1, wherein said elastic element is configured for being replaced without detaching said derailleur mount.

10. The derailleur mount of claim 1, wherein said elastic element has at least a portion made of metal.

11. The derailleur mount of claim 1, wherein said impact force is at least 300 Newton (N).

12. The derailleur mount of claim 1, wherein said elastic element is in collapsed state also when subjected to an impact force causing bending, and wherein said elastic element reverts from said collapsed state to said functional state immediately after said impact force causing bending is removed.

13. The derailleur mount of claim 12, wherein said elastic element is flat.

14. A derailleur mount for use in a bicycle, comprising:

an elastic element having a mechanical mechanism having at least one leaf spring, said elastic element having a functional state and a collapsed state, said elastic element being configured for reducing at least some of an impact force applied on a derailleur mechanism connected thereto by switching from said functional state to said collapsed state;

wherein said elastic element is configured for reverting from said collapsed state to said functional state after said impact force is removed, said elastic element being made of a material filled with at least one member of a group consisting of: glass fibers, metal fibers, steel fibers, steel beads, metal beads, and glass beads.

15. A derailleur mount for use in a bicycle, comprising:

an elastic element having a functional state and a collapsed state, said elastic element being configured for reducing at least some of an impact force applied on a derailleur mechanism connected thereto by switching from said functional state to said collapsed state;

wherein said elastic element is configured for reverting from said collapsed state to said functional state after said impact force is removed;

wherein said derailleur mount is integrally formed with at least one of a frame of said bicycle and a derailleur of said bicycle.

16. A derailleur mount for use in a bicycle, comprising:

an elastic element having a functional state and a collapsed state, said elastic element being configured for reducing at least some of an impact force applied on a derailleur mechanism connected thereto by switching from said functional state to said collapsed state;

wherein said elastic element is configured for reverting from said collapsed state to said functional state after said impact force is removed and for being replaced without detaching said derailleur mount.

* * * * *